US012673437B2

(12) United States Patent
Reed

(10) Patent No.: US 12,673,437 B2
(45) Date of Patent: Jul. 7, 2026

(54) KNIFE WITH PUSH BUTTON ARTICULATED SPRING

(71) Applicant: Scott Reed, Locust Grove, OK (US)

(72) Inventor: Scott Reed, Locust Grove, OK (US)

( * ) Notice: Subject to any disclaimer, the term of this patent is extended or adjusted under 35 U.S.C. 154(b) by 185 days.

(21) Appl. No.: 18/592,980

(22) Filed: Mar. 1, 2024

(65) Prior Publication Data

US 2025/0276458 A1 Sep. 4, 2025

(51) Int. Cl.
*B26B 1/04* (2006.01)
*B26B 1/10* (2006.01)

(52) U.S. Cl.
CPC ................ *B26B 1/046* (2013.01); *B26B 1/10* (2013.01)

(58) Field of Classification Search
CPC B26B 1/02; B26B 1/044; B26B 1/046; B26B 1/04; B26B 1/06; B26B 1/048
USPC ......... 30/155, 153, 156, 159, 160, 161, 337, 30/338, 342
See application file for complete search history.

(56) References Cited

U.S. PATENT DOCUMENTS

| | | | | |
|---|---|---|---|---|
| 4,040,181 A * | 8/1977 | Johnson | B26B 1/042 30/161 |
| 6,105,255 A | 8/2000 | Cheng | |
| 6,810,588 B1 * | 11/2004 | Cheng | B26B 1/046 30/160 |
| 7,051,441 B2 | 5/2006 | Carter, III | |
| 7,676,932 B2 * | 3/2010 | Grice | B26B 1/042 30/155 |
| 8,893,389 B2 | 11/2014 | Freeman | |
| 9,505,141 B2 | 11/2016 | Duey | |
| 9,527,218 B2 | 12/2016 | Valdez | |
| 9,707,687 B2 | 7/2017 | Onion | |
| 9,862,104 B2 * | 1/2018 | France | B26B 1/048 |
| 10,150,221 B1 * | 12/2018 | Chen | B26B 1/046 |
| 12,558,806 B1 * | 2/2026 | Anderson | B26B 11/00 |
| 2006/0230620 A1 * | 10/2006 | Steigerwalt | B26B 1/046 30/159 |
| 2006/0260137 A1 * | 11/2006 | Flagg | B26B 1/044 30/160 |
| 2013/0125403 A1 * | 5/2013 | Westerfield | B26B 1/046 30/161 |
| 2019/0061180 A1 * | 2/2019 | Nawaz | B26B 1/02 |

FOREIGN PATENT DOCUMENTS

| | | | |
|---|---|---|---|
| JP | 6253866 B1 * | 12/2017 | B23D 51/01 |
| WO | WO-2017194519 A1 * | 11/2017 | B26B 1/04 |

* cited by examiner

*Primary Examiner* — Ghassem Alie
(74) *Attorney, Agent, or Firm* — Harpman & Harpman

(57) ABSTRACT

A folding knife with a push button automatic open spring configuration to propel the pivoted knife blade outwardly from between the support handle frames. A bifurcated compound spring configuration has a transverse blade engagement portion and a pair of returning integral handle engagement arms against which the spring is compressed when in closed folded position within the handle. The bifurcated spring exerts opening force on the blade when the blade is released to a full open use position.

5 Claims, 6 Drawing Sheets

KNIFE WITH PUSH BUTTON ARTICULATED SPRING

BACKGROUND OF THE INVENTION

1. Technical Field

This invention relates to the field of folding knifes, more specifically spring actuated blades deploying the blade to an open useful full extended position automatically after release.

2. Description of Prior Art

Retractable knives that have folding pivoted blades that retract into the handle of the knife and have spring retainment and assist for deployment, see for example U.S. Pat. Nos. 6,105,255, 7,051,441, 7,676,932, 8,893,389, 9,707,687, 9,505,141 and 9,527,218.

U.S. Pat. No. 6,105,255 is directed to a folding knife having a leaf spring extending along the length of a registration slot in the compound handle.

U.S. Pat. No. 7,051,441 discloses a leaf spring assist open for a folding knife. The leaf spring defines an elongated arcuate configuration having a distal end to engage the tang of the blade and a shoulder engagement to tension the spring for blade deployment.

U.S. Pat. No. 8,893,389 is directed to a cantilever spring assist knife having a first end coupled to the handle and a second end adapted to act on the tang of the blade.

U.S. Pat. No. 7,676,932 illustrates a spring assisted blade in a folding knife. A spring assist closing force on a guide pin and the blade in closed position and on opening frames when blade is in partial open position.

U.S. Pat. No. 9,505,141 claims a folding knife with a manual mode and an automatic opening mode. A tension spring connected to pivot shaft enables opening in both modes.

U.S. Pat. No. 9,527,218 also shows dual operation modes with a spring assist.

U.S. Pat. No. 9,707,687 discloses an engagement mechanism which is switchable between engaged and disengaged condition in which the assisted opening mechanism is disabled so as not to provide opening assistance to the blade.

SUMMARY OF THE INVENTION

The present invention is dual bifurcated spring automatic opening actuation mechanism for a folding knife. A pivoted knife blade is retractable between a pair of handle frame and against the bifurcated spring engaging both handle frames and extending longitudinally and transversely against the edge at the base of the blade. A blade engagement lock holds the blade in closed position under spring tension until activation release of the blade and the engaged spring propels the hinge blade outwardly to open locked use position. The transverse engagement of the bifurcated spring on the blade assures stored energy transfer to the blade in a translateral manner.

DETAILED DESCRIPTION OF THE INVENTION

Figure 1:
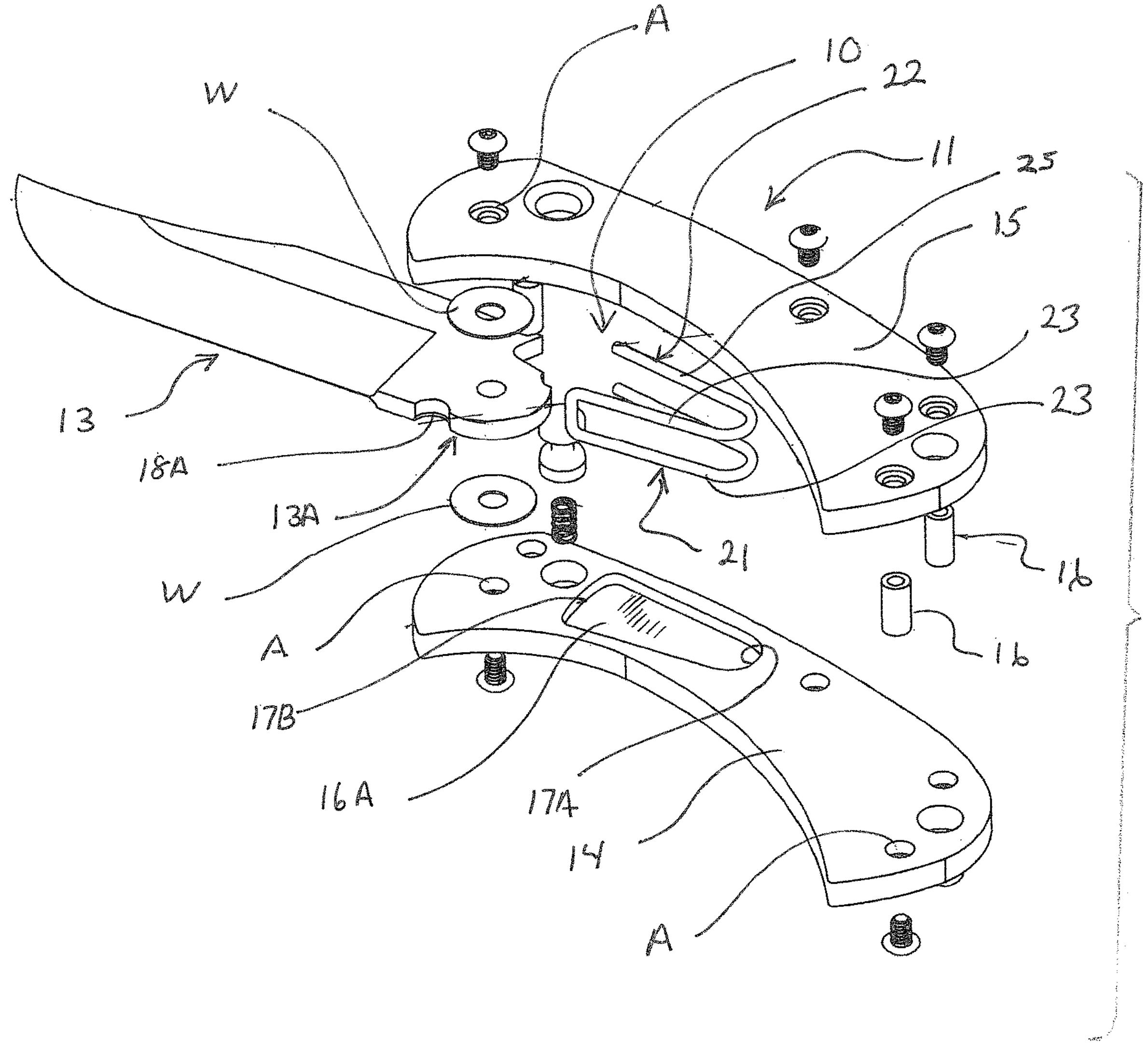
FIG. 1 is an exploded perspective view of the folding knife and spring of the invention in open position.
Figure 2:
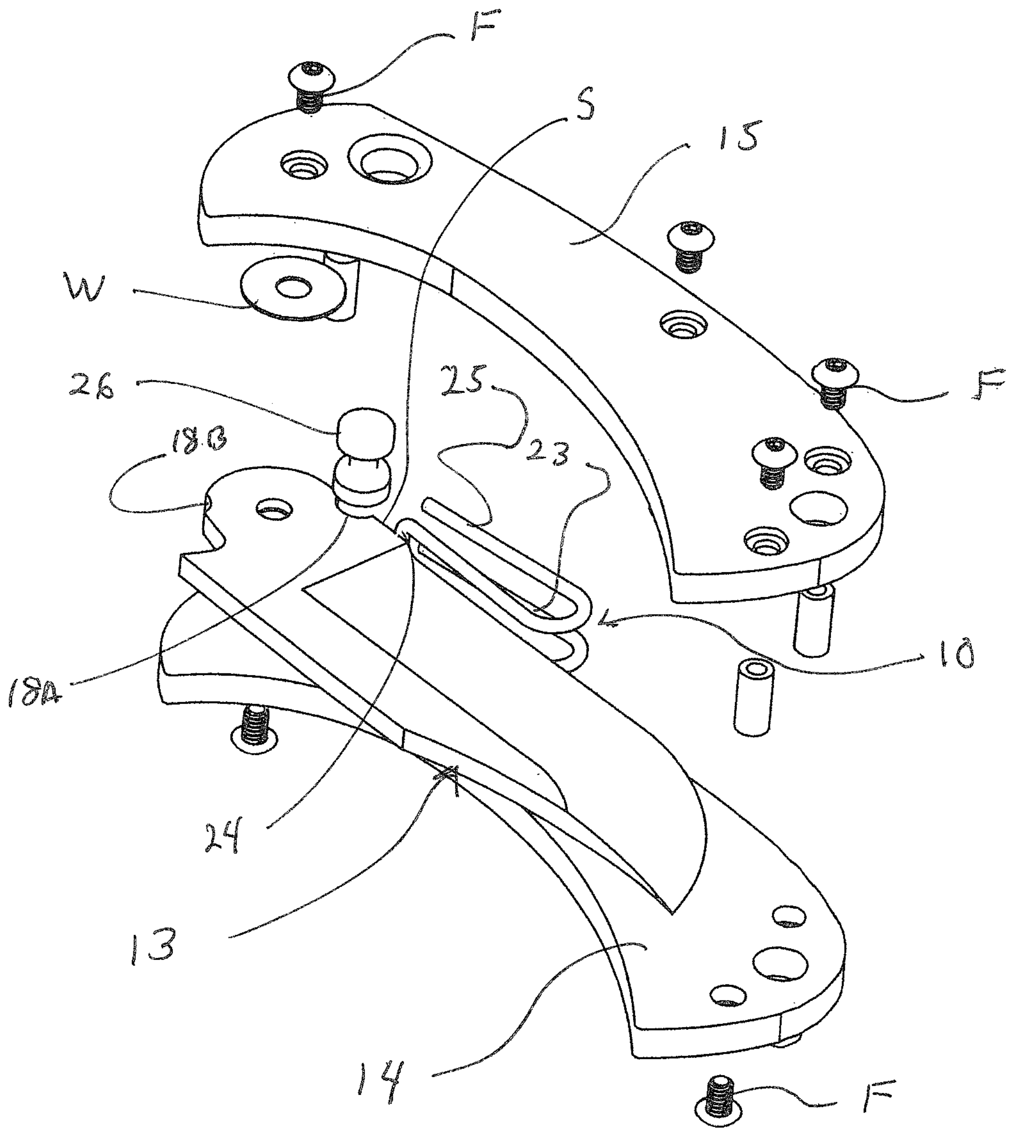
FIG. 2 is an exploded perspective view of the folding knife and spring of the invention in closed position.

Referring now to FIGS. 1 and 2 of the drawings, a dual spring 10 of the invention can be seen in a folding knife 11. The folding knife 11 has a handle portion 12 adapted to receive a knife blade 13 pivotally positioned there within. The exploded view shows the handle portion 12 having a pair of oppositely disposed identical frame members 14 and 15, each having multiple assembly apertures A aligned with one another for receiving tubular spacers 16 and corresponding fasteners F there through.

Spring receiving recesses 16A and 16B are formed respectively in each of the frame members 14 and 15 in aligned facing orientation to receive and hold the dual spring 10 of the invention there within. The folding knife blade 13 proximal end having an apertured contoured arcuate surface tang 13A for receiving a blade pivot pin assembly there through with aligned apertures in the corresponding frame members 14 and 15 have oppositely disposed spacer washers W and a pair of interengaging thread fasteners F for pivotally securing the blade 13 to the handle portion 12, as will be well understood by those skilled in the art.

Figure 5:
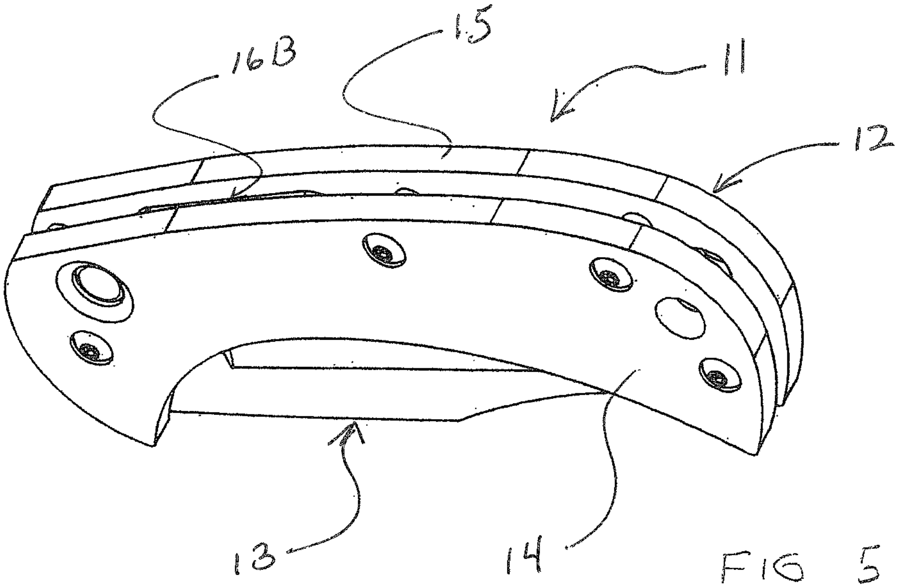
FIG. 5 is a perspective view of a folding knife in closed position prior to deployment of the blade.

The proximal end of the knife blade 13 tang 13A has a release engagement and retainment notches 18A and 18B aligned to receive a spring urged release button 26 as best seen in FIG. 5 of the drawings that is movable from a depressed release position to an engagement lock in both blade open and closed position.

As noted, the dual spring 10 of the invention is retained within the corresponding spring receiving and retaining recesses 16A and 16B that are of a general V-shape with a reduced transverse arcuate base end 17A tapering outwardly to an oppositely disposed wider distal end 17B.

Referring now to FIGS. 1-4 and 6-9 of the drawings, the dual spring 10 of the invention can be seen having a blade engagement portion 21 and a frame engagement portion 22. The dual spring 10 is formed from a continuous length of contoured wire resilient material, in the example spring steel which under translateral compression will impart stored kinetic energy when released. The blade engagement portion 21 defines an elongated U-shaped configuration with a pair of spaced parallel extending arms 23 interconnected by an integral end linkage 24 that is in direct transverse contact with the knife blade 13 adjacent the blade retaining and release notches 18A in the tang 13A when folded in closed position with the spring 10 in compressed orientation as seen in FIGS. 2 and 5 of the drawings.

The spring frame engagement portion 22 has a pair of spaced parallel free end arms 25 that are interconnected to the respective corresponding blade engagement arms 22 in oppositely disposed relation thereto in a continuous configuration.

The frame engagement arms 25 are therefore registerable within the respective spring receiving recesses 16A and 16B as hereinbefore described when assembled.

Figure 6:
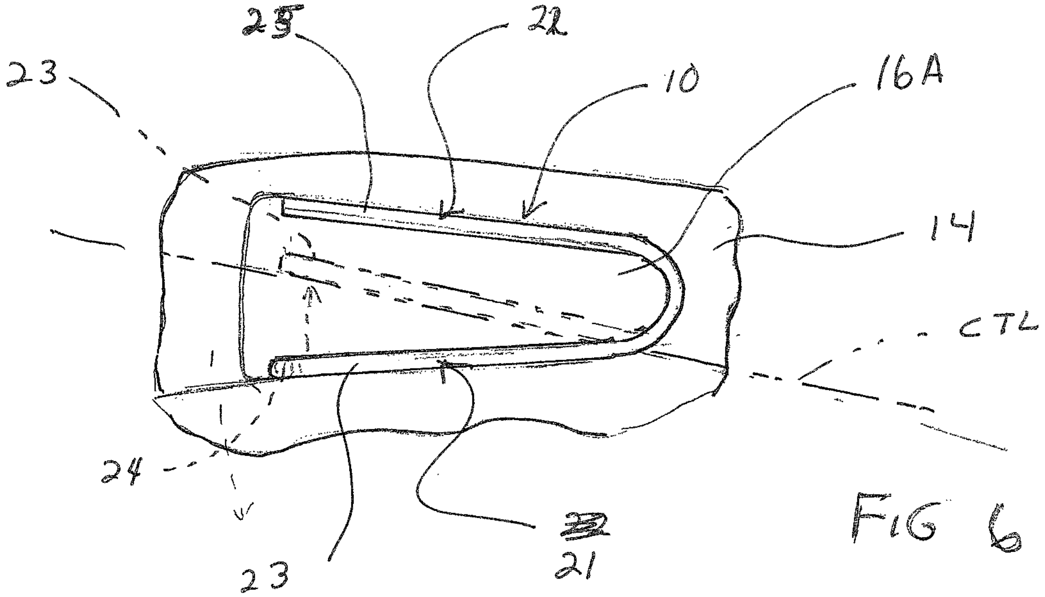
FIG. 6 is an enlarged side elevational view of the knife's spring in rest position and in compressed position shown in broken lines within a spring retaining frame of the handle.
Figure 7:
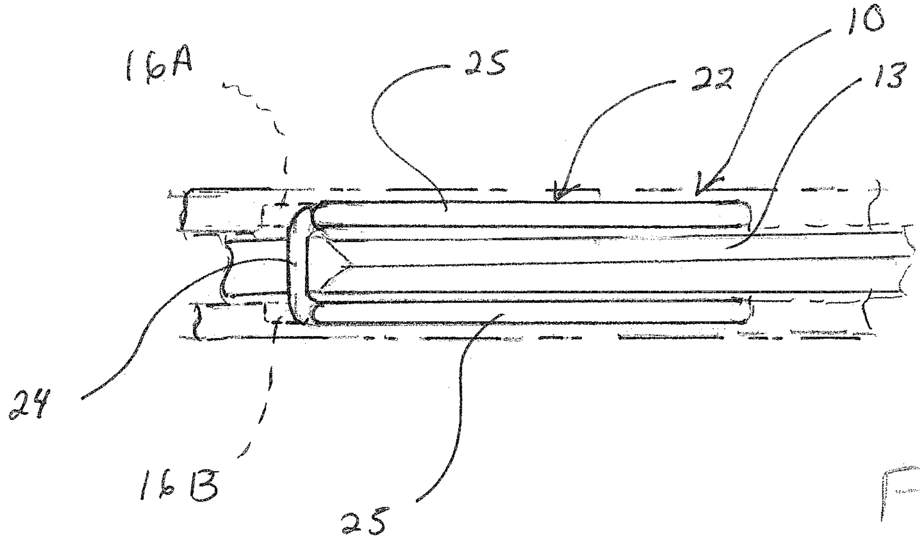
FIG. 7 is a top plan view thereof.
Figure 8:
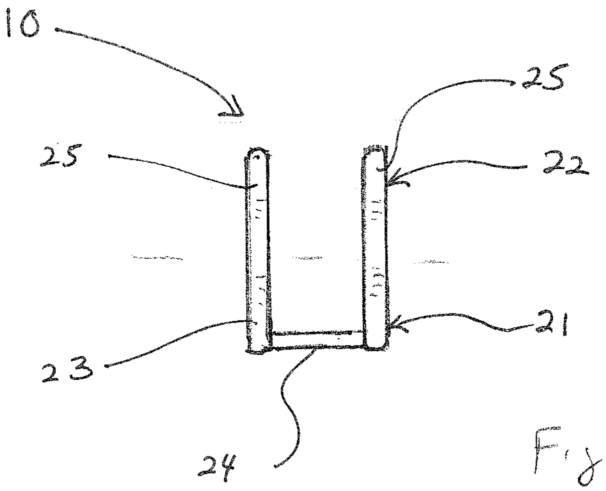
FIG. 8 is an end elevational view of the knife spring.
Figure 9:
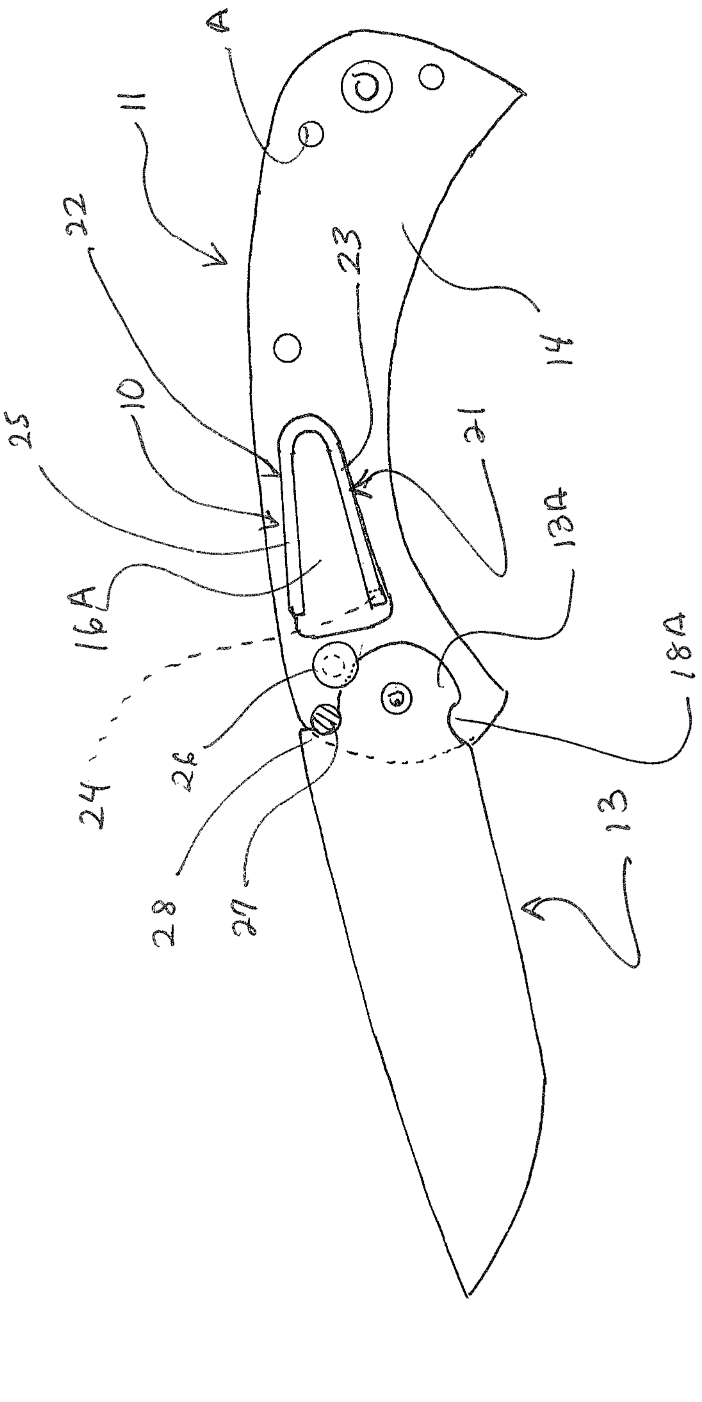
FIG. 9 is a side elevational sectional view of the folding knife and spring in open locked position.

It will be apparent that the spring force, force exerted by the spring perpendicular to the contact tangency line CTL on the knife blade, illustrated best in FIG. 6 of the drawings, supplies the opening force to the blade 13 once released sufficient to open the knife blade to a blade extended locked position as illustrated in FIG. 9 of the drawings.

Figure 3:
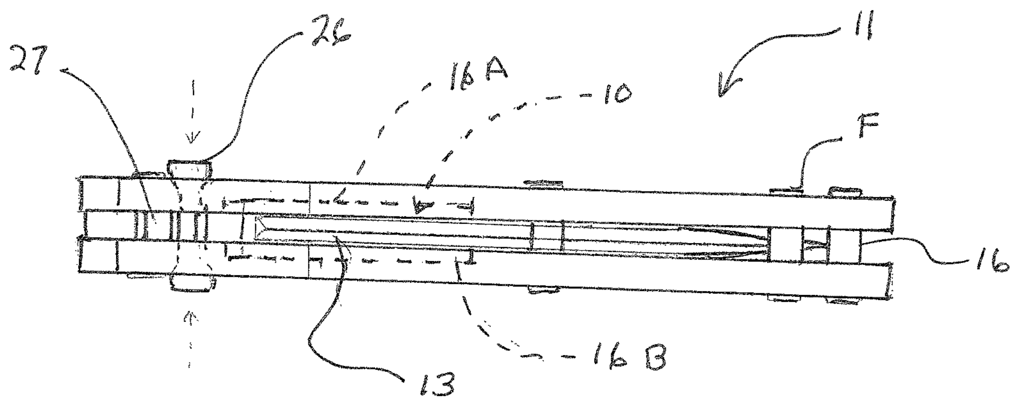
FIG. 3 is an enlarged top plan view of the folding knife in closed position.
Figure 4:
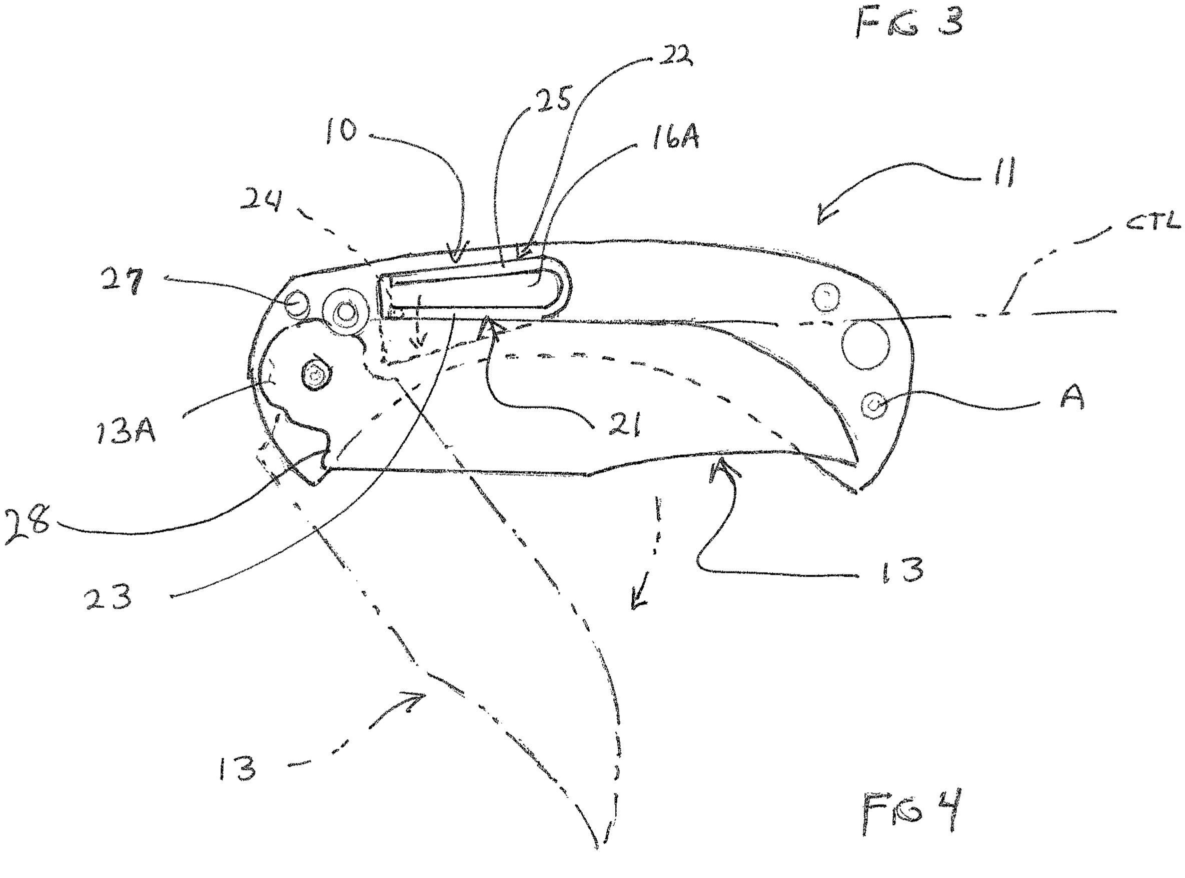
FIG. 4 is a graphic sectional view of the folding knife with the spring of the invention in closed compressed position shown in solid lines and in open position in broken lines.

In application, the dual spring 10 is assembled into the knife frame members 14 and 15 in aligned spring receiving recesses 16A and 16B, best seen in FIGS. 3, 4 and 6 of the drawings in a blade open configuration illustrated in FIGS. 1 and 9 of the drawings. Once assembled by corresponding interengaging fasteners F, the knife frames 14 and 15 secure the aforementioned dual spring 10 and folding knife blade 13 within the spring receiving area with a spring urged blade lock and release button 26 in positional orientation there through.

It will be seen in operation, the assembled release button 26 when depressed releases the knife blade 13 allowing it to move from an open locked use position to a folded lock position within the handle portion 12 thereby compressing the dual spring 10 within the spring receiving recesses 16A and 16B as seen in FIGS. 2, 5 and 6 of the drawings with the lock button 26 engaged in the corresponding notch locking the blade in place under spring tension.

For activation and automatic release, the lock button 26 is then depressed displacing the button from a temporary locking engagement within the recess notch 18A in the proximal end tang 13A of the knife blade 13.

The dual spring 10 in transverse linkage 24 engagement with the knife blade 13 surface S is released propelling the knife blade 13 from within the handle portion 12 to a fully open position as seen in FIGS. 1 and 9 of the drawings.

A blade stop pin 27 fixed to the handle frame engages the knife blade 13 upstanding stop portion 28 and the spring urged release button 26 registers in the locking notch 18B of blade in the handle in open locked position.

Correspondingly, to close the knife 11, the release button 26 is depressed displacing the button from the locking notch 18B allowing the blade 13 to be folded into the handle portion 12 engaging and compressing the dual spring 10 as hereinbefore described.

It will be evident that the release button 26 automatically engages the tang notch 18A locking the blade in closed folded position, as seen in FIG. 4 of the drawings.

It will be seen that by providing a bifurcated dual spring 10 in transverse end registration against the blade surface independently of the blade tang 13B that a true auto opening "switch blade folding knife" can be achieved.

It will thus be seen that a new and novel bifurcated dual spring for application use within an automatic release folding knife has been illustrated and described and it will be apparent to those skilled in the art that various changes and modifications may be made thereto without departing from the spirit of the invention. Therefore, I claim:

The invention claimed is:

1. An automatic opening folding blade knife comprising, a handle portion having a pair of frame members defining a recess into which a knife blade is capable of retracting, a dual bifurcated blade engagement spring retained within said handle portion, said dual bifurcated blade engagement spring having elongated pairs of vertically spaced parallel arms, said arm pairs interconnected to one another defining frame members engagement arm pair and a blade engagement arm pair of a single spring wire in spaced vertical overlying position to one another, said blade engagement arm pair having a continuous end linkage for direct transverse contact with said knife blade when retracted within the handle recess, a blade release, registerable with said knife blade.

2. The automatic opening folding blade knife of claim 1 wherein said knife blade has an apertured proximal end tang with locking and release notches therein.

3. The automatic opening folding blade knife of claim 1 wherein said dual bifurcated blade engagement spring applies force on said blade adjacent to said blade release when in retracted closed position.

4. The automatic opening folding blade knife of claim 1 wherein said dual bifurcated blade engagement spring frame members engagement arm pair have respective free ends in contact with said frame member and are in spaced vertical overlying position to said blade engagement arm pair continuous end linkage.

5. The automatic opening folding blade knife of claim 1 wherein said blade release registerable with said knife blade comprises, a spring urged button extending into said frame and said handle portion.

* * * * *